US012254336B2

(12) United States Patent
Ikeda

(10) Patent No.: US 12,254,336 B2
(45) Date of Patent: Mar. 18, 2025

(54) INFORMATION PROCESSING SYSTEM AND METHOD OF CONTROLLING INFORMATION PROCESSING SYSTEM

(71) Applicant: CANON KABUSHIKI KAISHA, Tokyo (JP)

(72) Inventor: Atsushi Ikeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 314 days.

(21) Appl. No.: 17/405,163

(22) Filed: Aug. 18, 2021

(65) Prior Publication Data

US 2022/0066810 A1 Mar. 3, 2022

(30) Foreign Application Priority Data

Sep. 1, 2020 (JP) .................. 2020-147084

(51) Int. Cl.
*G06F 3/00* (2006.01)
*G06F 9/455* (2018.01)
*G06F 16/958* (2019.01)

(52) U.S. Cl.
CPC ........ *G06F 9/45558* (2013.01); *G06F 16/958* (2019.01); *G06F 2009/45583* (2013.01)

(58) Field of Classification Search
CPC ..................................................... G06F 9/455
See application file for complete search history.

(56) References Cited

U.S. PATENT DOCUMENTS

| 6,094,662 A * | 7/2000 | Hawes ................ G06F 16/9574 |
| 8,200,962 B1 * | 6/2012 | Boodman ........... H04L 63/0823 |
| | | 713/176 |
| 9,384,026 B1 * | 7/2016 | Banga ................. G06F 9/45558 |
| 9,471,704 B2 * | 10/2016 | Yuan .................. G06F 16/9574 |
| 9,740,791 B1 * | 8/2017 | Killian ................. G06F 40/143 |
| 11,132,126 B1 * | 9/2021 | Chmiel ............... G06F 11/1466 |
| 11,263,386 B1 * | 3/2022 | Beals .................... G06F 40/106 |
| 11,588,844 B1 * | 2/2023 | Lee ......................... H04L 67/56 |
| 2002/0138621 A1 * | 9/2002 | Rutherford .............. H04L 9/40 |
| | | 709/200 |
| 2003/0142126 A1 * | 7/2003 | Estrada .................. G06Q 10/10 |
| | | 715/738 |

(Continued)

FOREIGN PATENT DOCUMENTS

| JP | 2009-053955 A | 3/2009 |
| JP | 2013-191090 A | 9/2013 |

(Continued)

OTHER PUBLICATIONS

Chris Grier, Secure web browsing with the OP web browse. (Year: 2008).*

(Continued)

*Primary Examiner* — Lechi Truong
(74) *Attorney, Agent, or Firm* — Carter, DeLuca & Farrell LLP

(57) ABSTRACT

A virtual machine comprises a browser and an output unit configured to output a file generated while the browser interprets and processes a Web page to storage, which is different from a storage region that the virtual machine has and can be shared with another virtual machine different from the virtual machine.

6 Claims, 15 Drawing Sheets

(56) References Cited

U.S. PATENT DOCUMENTS

| | | | |
|---|---|---|---|
| 2005/0188361 A1* | 8/2005 | Cai | G06F 16/958 |
| | | | 717/148 |
| 2006/0015817 A1* | 1/2006 | Fioretti | G06F 16/9577 |
| | | | 715/765 |
| 2006/0036940 A1* | 2/2006 | Hsiu-Ping | G06F 16/9577 |
| | | | 707/E17.121 |
| 2006/0182016 A1* | 8/2006 | Walker | H04N 21/2662 |
| | | | 370/208 |
| 2008/0104608 A1* | 5/2008 | Hyser | G06F 9/5088 |
| | | | 718/105 |
| 2011/0231631 A1* | 9/2011 | Matsuzawa | G06F 3/0644 |
| | | | 711/E12.059 |
| 2013/0031459 A1* | 1/2013 | Khorashadi | G06F 16/94 |
| | | | 715/234 |
| 2013/0208296 A1* | 8/2013 | Yoshida | H04N 1/00464 |
| | | | 358/1.14 |
| 2013/0232480 A1* | 9/2013 | Winterfeldt | G06F 9/5072 |
| | | | 717/177 |
| 2014/0280756 A1* | 9/2014 | Maity | H04L 67/131 |
| | | | 709/219 |
| 2015/0121193 A1* | 4/2015 | Beveridge | G06F 40/143 |
| | | | 715/234 |
| 2017/0154017 A1* | 6/2017 | Kristiansson | G06F 40/143 |
| 2017/0286525 A1* | 10/2017 | Li | G06N 20/00 |
| 2017/0366353 A1* | 12/2017 | Struttmann | G06F 21/6218 |
| 2018/0121111 A1* | 5/2018 | Swallow | G06F 11/2025 |
| 2018/0121464 A1 | 5/2018 | Araki | |
| 2018/0341388 A1* | 11/2018 | Zheng | G06T 11/206 |
| 2019/0173765 A1* | 6/2019 | Bertran | H04L 41/147 |
| 2020/0342049 A1* | 10/2020 | Carter | G06F 16/986 |
| 2021/0029201 A1* | 1/2021 | Masurekar | H04L 67/10 |
| 2022/0156240 A1* | 5/2022 | Smith | G06F 16/2358 |
| 2022/0366125 A1* | 11/2022 | Kim | G06F 40/14 |
| 2024/0378183 A1* | 11/2024 | Du | G06F 16/2246 |

FOREIGN PATENT DOCUMENTS

| | | |
|---|---|---|
| JP | 2014-102835 A | 6/2014 |
| JP | 2014-199596 A | 10/2014 |
| JP | 2015-087832 A | 5/2015 |
| JP | 2015-153410 A | 8/2015 |
| JP | 2016-524762 A | 8/2016 |
| JP | 2017-154466 A | 9/2017 |
| JP | 2017-207805 A | 11/2017 |
| JP | 2018-018310 A | 2/2018 |
| JP | 2018-124827 A | 8/2018 |
| JP | 6369043 B2 | 8/2018 |
| JP | 2018-156594 A | 10/2018 |
| WO | 2008/069125 A1 | 6/2008 |
| WO | 2017/056238 A1 | 4/2017 |
| WO | 2020/008600 A1 | 1/2020 |

OTHER PUBLICATIONS

Amr Awadallah, The vMatrix: A Network of Virtual Machine Monitors for Dynamic Content Distribution. (Year: 2002).*
Jeffrey Bickford, Safe Internet Browsing using a Transparent Virtual Browser. (Year: 2015).*
Hong Yin, Web Search Context Management Using Javascript/Cookie and JSP/Database Technologies. (Year: 2001).*
Notice of Reasons for Refusal issued by the Japanese Patent Office on Jun. 21, 2024 in corresponding JP Patent Application No. 2020-147084, with English translation.
Decision of Refusal issued by the Japanese Patent Office on Nov. 18, 2024 in corresponding JP Patent Application No. 2020-147084, with English translation.

* cited by examiner

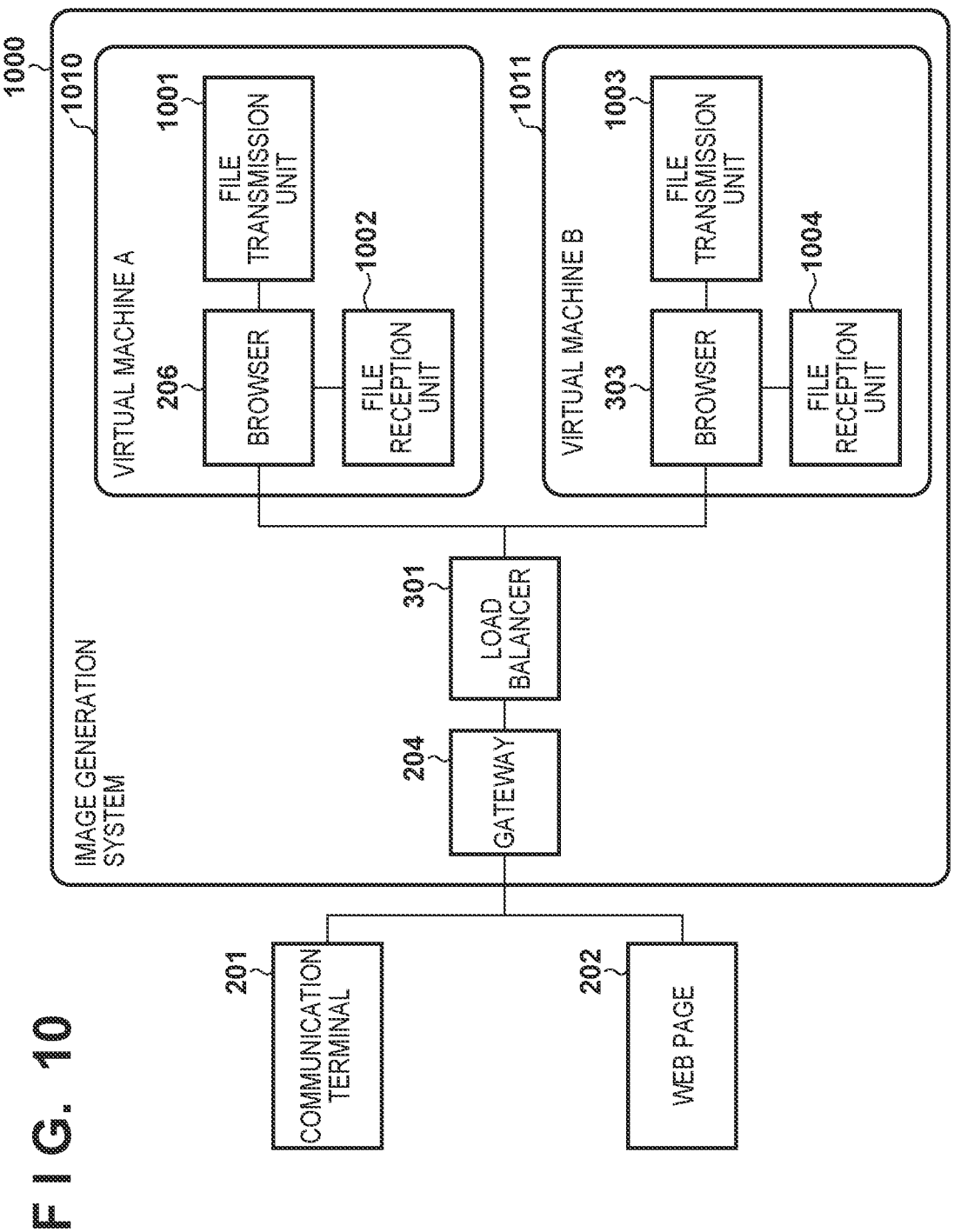

INFORMATION PROCESSING SYSTEM AND METHOD OF CONTROLLING INFORMATION PROCESSING SYSTEM

BACKGROUND OF THE INVENTION

Field of the Invention

The present invention relates to a technique for processing a file generated while a browser interprets and processes a Web page.

Description of the Related Art

Currently, communication terminals equipped with a Web browser (hereinafter, referred to as "browser") and has a function by which it is possible to browse Web pages on the browser are popular. By displaying a web page of an external service through the browser, the communication terminal can link with the external service.

As a form of browser, there is a form called a cloud browser that generates a rendering result of a web page on a cloud server. According to the cloud browser, by executing high-computational-load processing such as web page analysis processing and execution processing on the server, a computational load on the communication terminal is eliminated.

In the cloud browser, a browser runs on a virtual machine that runs on a cloud server. Virtual machines are virtually allocated various device resources required by a PC. For this reason, a browser running on a virtual machine can behave in the same way as a browser running on a PC. In the cloud browser, a method of switching the type of browser to be started depending on whether or not privacy-related information will be handled has been proposed (Japanese Patent No. 6369043).

Japanese Patent No. 6369043 utilized a browser running on a single virtual machine for a plurality of communication terminals. However, when implementing measures to ensure the availability and durability of cloud browsers, there was a problem that the Web standard technology for manipulating local files would not work correctly.

For example, to ensure the availability and durability of a cloud browser, a case where a plurality of virtual machines are provided on the cloud server and the virtual machines to be used are distributed by a load balancer is considered. Specifically, assume that a virtual machine A and a virtual machine B are provided. At this time, the same browser is running on the virtual machine A and the virtual machine B.

At this time, assume that the Web page displayed by the browser uses a Web standard specification called localStorage (hereinafter, "local storage"). When using the local storage, the browser generates a local file and records the information specified by the Web page in it. The local storage is a widely used specification. The local storage is an API defined by HTML5 and is a mechanism that allows users to store their data in a browser (local environment). Here, the local file is a file to be stored in the browser (local environment) in accordance with the local storage, which is a Web standard specification, and the like.

Assume that when a communication terminal uses a cloud browser for the first time, the load balancer requests the virtual machine A to process it. At this time, the browser generates a local file on the virtual machine A and records the Web page information in it. Here, assume that when the communication terminal uses a cloud browser for the second time, the load balancer requests the virtual machine B to process it. At this time, the browser refers to the local file on the virtual machine B, but there is no local file on the virtual machine B, so the local storage does not behave as intended.

For this reason, when running a cloud browser on a plurality of virtual machines, a method by which it is possible to refer to an existing local file regardless of on which virtual machine the browser is running is desired.

SUMMARY OF THE INVENTION

The present invention provides a technique for enabling a file generated while a browser of a virtual machine interprets and processes a web page to be shared with other virtual machines.

According to the first aspect of the present invention, there is provided an information processing system comprising: a virtual machine, wherein the virtual machine comprises: a browser; and an output unit configured to output a file generated while the browser interprets and processes a Web page to storage, which is different from a storage region that the virtual machine has and can be shared with another virtual machine different from the virtual machine.

According to the second aspect of the present invention, there is provided a method of controlling an information processing system, the method comprising: outputting, to storage, a file generated while a browser that a virtual machine of the information processing system has interprets and processes a Web page, which is different from a storage region that the virtual machine has and can be shared with another virtual machine different from the virtual machine.

Further features of the present invention will become apparent from the following description of exemplary embodiments with reference to the attached drawings.

BRIEF DESCRIPTION OF THE DRAWINGS

FIG. 10 is a block diagram illustrating a configuration example of a system of a cloud browser according to a third embodiment.

DESCRIPTION OF THE EMBODIMENTS

Figure 1:
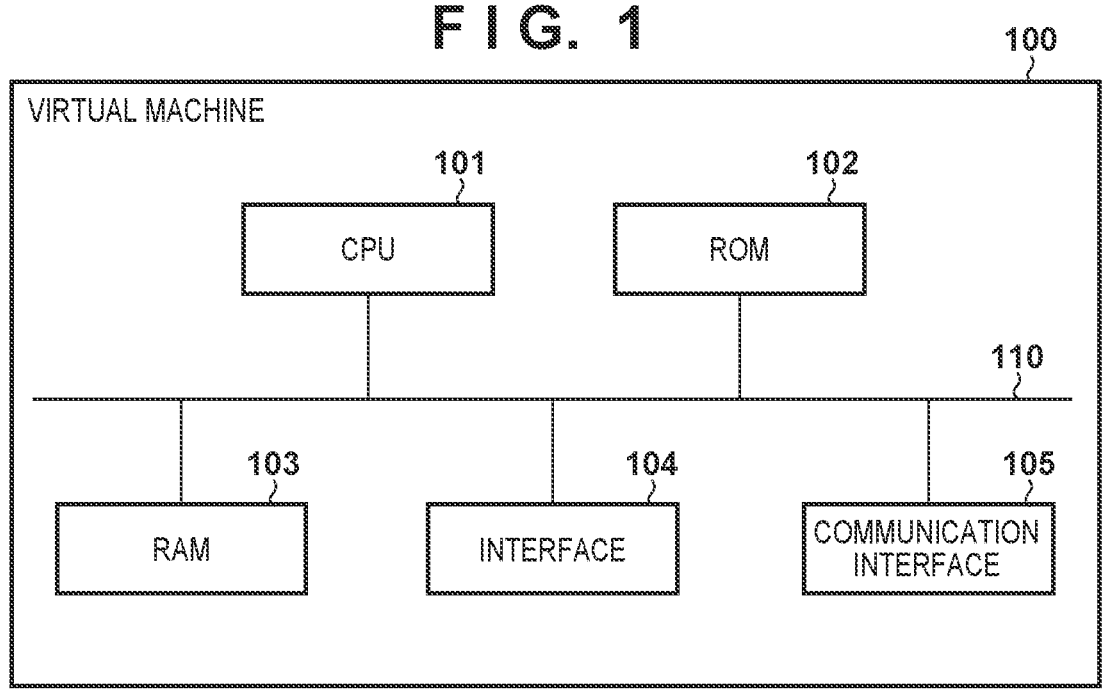
FIG. 1 is a block diagram illustrating an example of a hardware configuration of a virtual machine.

Hereinafter, embodiments will be described in detail with reference to the accompanying drawings. Note, the following embodiments are not intended to limit the invention according to the scope of the claims. Although a plurality of features are described in the embodiments, not all of the plurality of features are essential to the present invention, and the plurality of features may be arbitrarily combined. Furthermore, in the accompanying drawings, the same reference numerals are assigned to the same or similar components, and a repetitive description thereof is omitted.

First Embodiment

In the present embodiment, a local file generated while a browser interprets and processes a Web page is stored in storage corresponding to the data type (data format) of the local file among a plurality of units of storage different from the storage region of a virtual machine. Assume that the data format of the local file handled in the present embodiment is, but is not limited to, a key-value format, a document format, and an object format. Switching the storage destination (storage) of the local file in accordance with the data format of the local file can lead to improvement of the maintainability of the system, improvement of the reading speed, reduction of the usage fee of the storage, and the like. Here, the local file is a file to be stored in the browser (local environment) in accordance with the local storage, which is a Web standard specification, and the like. Also, the local file may be a file to be stored in the browser (local environment) in accordance with sessionStorage, which is a Web standard specification. That is, the local file may be a file that is stored in accordance with Web Storage, which is a Web standard specification.

Here, as a storage destination of a local file in a key-value format generated in the virtual machine by the Web standard technology, there is the local storage. On the other hand, as a local file in an object format generated in the virtual machine by the Web standard technology, there is a file generated by Indexed Database API specification (hereinafter, IndexedDB). IndexedDB is a specification that holds values and objects in a local database, and a file is created to record this information.

An example of a hardware configuration of a virtual machine that operates in an information processing system according to the present embodiment will be described with reference to a block diagram of FIG. 1.

A CPU (Central Processing Unit) 101 executes various processes using a computer program or data stored in the ROM (Read Only Memory) 102 or RAM (Random Access Memory). By this, the CPU 101 controls the operation of the entire virtual machine 100 and executes or controls the respective processing described to be performed by the virtual machine 100.

The ROM 102 stores setting data of the virtual machine 100, computer programs and data related to startup of the virtual machine 100, computer programs and data related to basic operation of the virtual machine 100, and the like.

A RAM 103 has an area for storing computer programs or data loaded from the ROM 102 and data received from external devices via a communication interface 105. The RAM 103 also includes a work area used for when the CPU 101 performs various processes. As described above, the RAM 103 can provide various areas (storage regions) as appropriate.

An interface 104 is an interface including a display unit for displaying a result of processing by the CPU 101 with images, text, and the like, and an operation unit which the user operates to perform various operation inputs. The display unit includes a liquid crystal screen and a touch panel screen. The operation unit includes user interfaces such as a keyboard, a mouse, and a touch panel screen.

The communication interface 105 is an interface for performing data communication with external devices. The CPU 101, the ROM 102, the RAM 103, the interface 104, and the communication interface 105 are all connected to a bus 110.

Note, the configuration illustrated in FIG. 1 is only an example of a configuration applicable to the virtual machine according to the present embodiment, and does not intend to limit the present invention to the configuration illustrated in FIG. 1. For example, in the configuration illustrated in FIG. 1, a memory device may be further connected to the bus 110. The memory device includes, for example, a hard disk drive, a USB memory, a magnetic card, an optical card, an IC card, a memory card, and a drive device (a drive device of a storage medium such as an optical disk such as a flexible disk (FD) or a Compact Disc (CD)). A "storage region of the virtual machine" to be described later may be configured by such a memory device. Incidentally, the virtual machine 100 may be configured by a so-called virtualization technique, and various resources comprising a computer system may be organized in logical units independent of the physical configuration. That is, the virtual machine 100 can be configured by integrating a plurality of resources, or one resource can be divided and one of those can be configured as the virtual machine 100. That is, the virtual machine 100 can be configured by using at least some of a plurality of resources (which can be configured by a plurality of devices) of the information processing system that configures the cloud.

Figure 2:
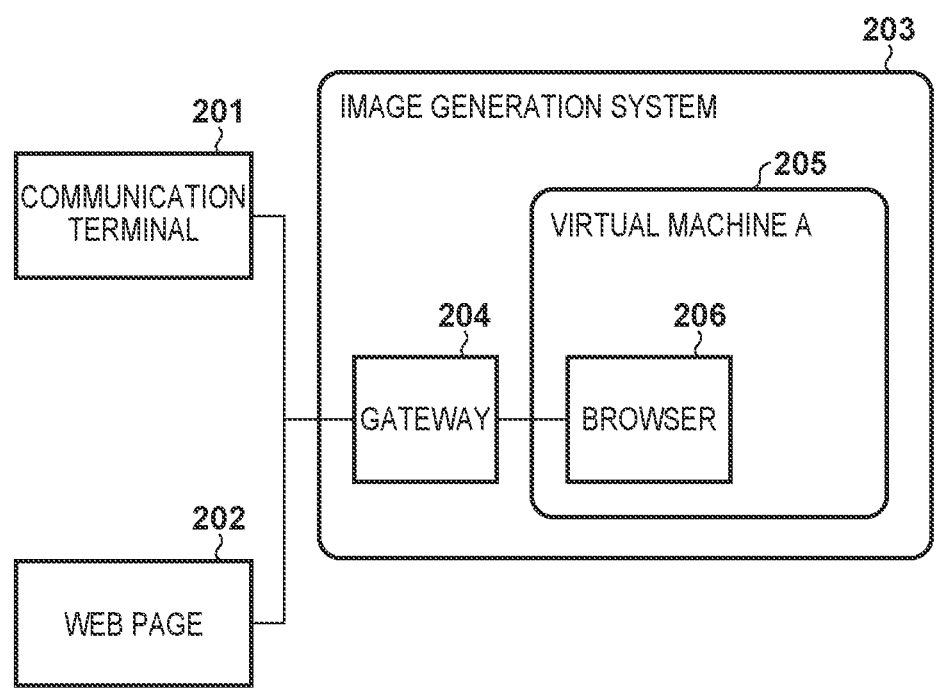
FIG. 2 is a block diagram illustrating a configuration example of a system of a conventional cloud browser.

Here, a configuration example of a system of a conventional cloud browser will be described with reference to a block diagram of FIG. 2. In the system of FIG. 2, the user is viewing the screen of a communication terminal 201, and when the user inputs a request for viewing a Web page 202 that they wish to view by operating the communication terminal 201, the communication terminal 201 transmits the address of the Web page 202 (hereinafter, referred to as a URL as an example) to an image generation system 203, which serves as an information processing system installed on the cloud.

A browser 206 in a virtual machine A 205 of the image generation system 203 receives the URL of the Web page 202 transmitted from the communication terminal 201 via a gateway 204. The browser 206 then accesses the Web page 202 corresponding to the received URL via the gateway 204 and generates a rendering result of the Web page 202. The browser 206 then transmits the rendering result of the generated Web page 202 to the communication terminal 201 via the gateway 204.

The communication terminal 201 receives the rendering result of the Web page 202 transmitted from the image generation system 203 and presents the Web page 202 to the user by displaying the received rendering result or the like.

Next, a configuration example of a system that improves the availability of the conventional cloud browser will be described with reference to a block diagram of FIG. 3. The system of FIG. 3 employs an image generation system 300 in which a load balancer 301 and a virtual machine B 302 have been added to the image generation system 203, instead of the image generation system 203 in the system of FIG. 2. Accordingly, the image generation system 300 is also an information processing system installed on the cloud.

The load balancer 301 determines whether to start the virtual machine A 205 or the virtual machine B 302 in accordance with the data volume of communication that passes through the gateway 204, the characteristics of the communication, and the like, and one of the virtual machines that accords with the result of the determination starts. The virtual machine B 302 has the same configuration as the virtual machine A 205 and performs the same operation as the virtual machine A 205 when started.

Figure 3:
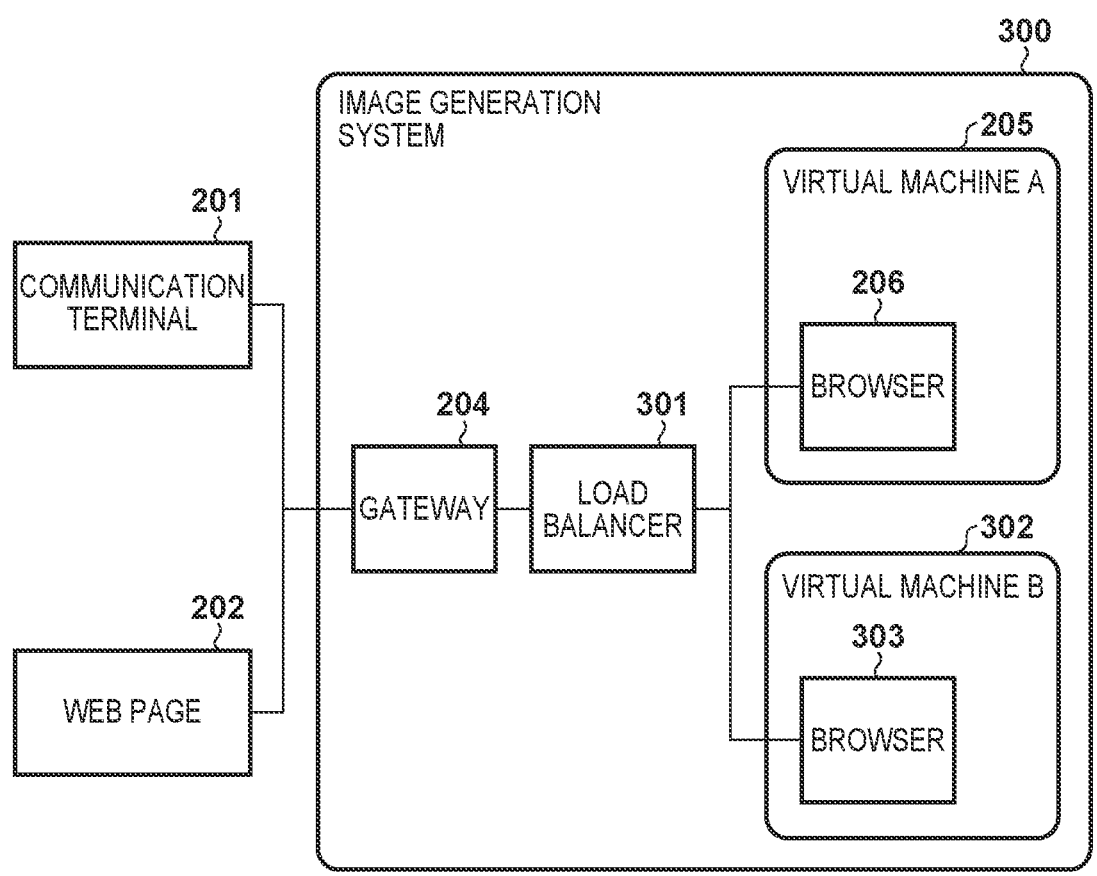
FIG. 3 is a block diagram illustrating a configuration example of a system that improves the availability of the conventional cloud browser.

In the configuration of FIG. 3, each of the browser 206 of the virtual machine A 205 and a browser 303 of the virtual machine B 302 stores the local file that it generated in the storage region of its virtual machine, so the local files cannot be shared between the virtual machines.

Figure 4:
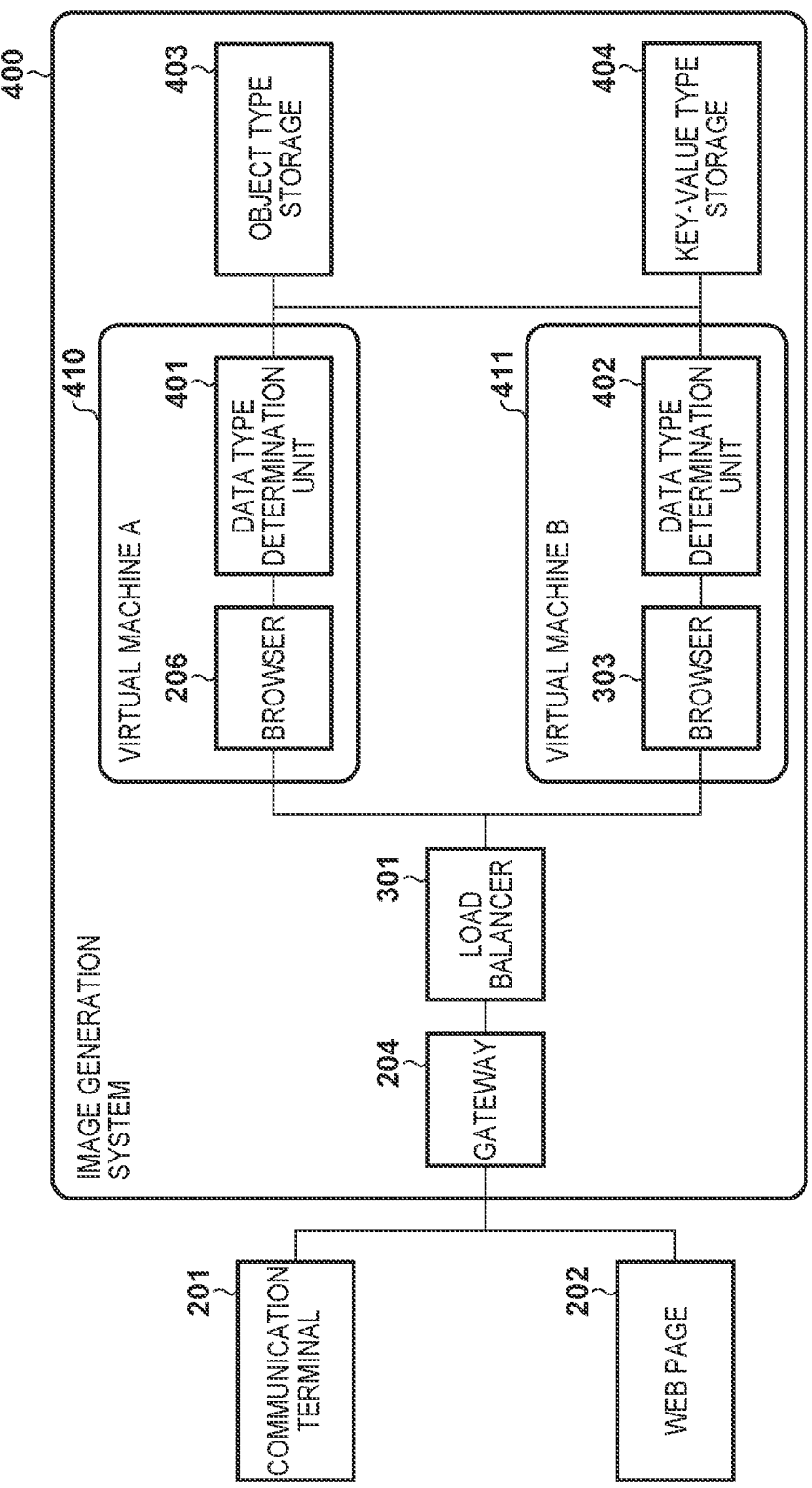
FIG. 4 is a block diagram illustrating a configuration example of a system of a cloud browser according to a first embodiment.

Next, a configuration example of a system of a cloud browser according to the present embodiment will be described with reference to a block diagram of FIG. 4. In the system of FIG. 4, the image generation system 300 has been replaced with an image generation system 400 in the system of FIG. 3. A virtual machine A 410 in the image generation system 400 is the virtual machine A 205 of the image generation system 300 to which a data type determination unit 401 has been added, and a virtual machine B 411 is the virtual machine B 302 of the image generation system 300 to which a data type determination unit 402 has been added. The image generation system 400 also includes object type storage 403 and key-value type storage 404 that are separate storage from the storage region of the virtual machine A 410 (such as the RAM 103 or other memory devices) and the storage region of the virtual machine B 411 (such as the RAM 103 or other memory devices). Accordingly, the image generation system 400 is also an information processing system installed on the cloud. The object type storage 403 and the key-value type storage 404 are storage regions that can be shared among a plurality of virtual machines.

Also in the system of FIG. 4, when the user inputs a request for viewing the Web page 202 that they wish to view by operating the communication terminal 201, the communication terminal 201 transmits the URL of the Web page 202 to the image generation system 400. The load balancer 301 determines whether to start the virtual machine A 410 or the virtual machine B 411 in accordance with the data volume of communication that passes through the gateway 204, the characteristics of the communication, and the like, and one of the virtual machines that accords with the result of the determination starts.

The specific names of the object type storage 403 and the key-value type storage 404 will be described here using Amazon Web Services® as an example. There is Amazon S3® in object type storage in Amazon Web Services. Also, there is Amazon DynamoDB® in key-value type storage in Amazon Web Services.

Figure 5:
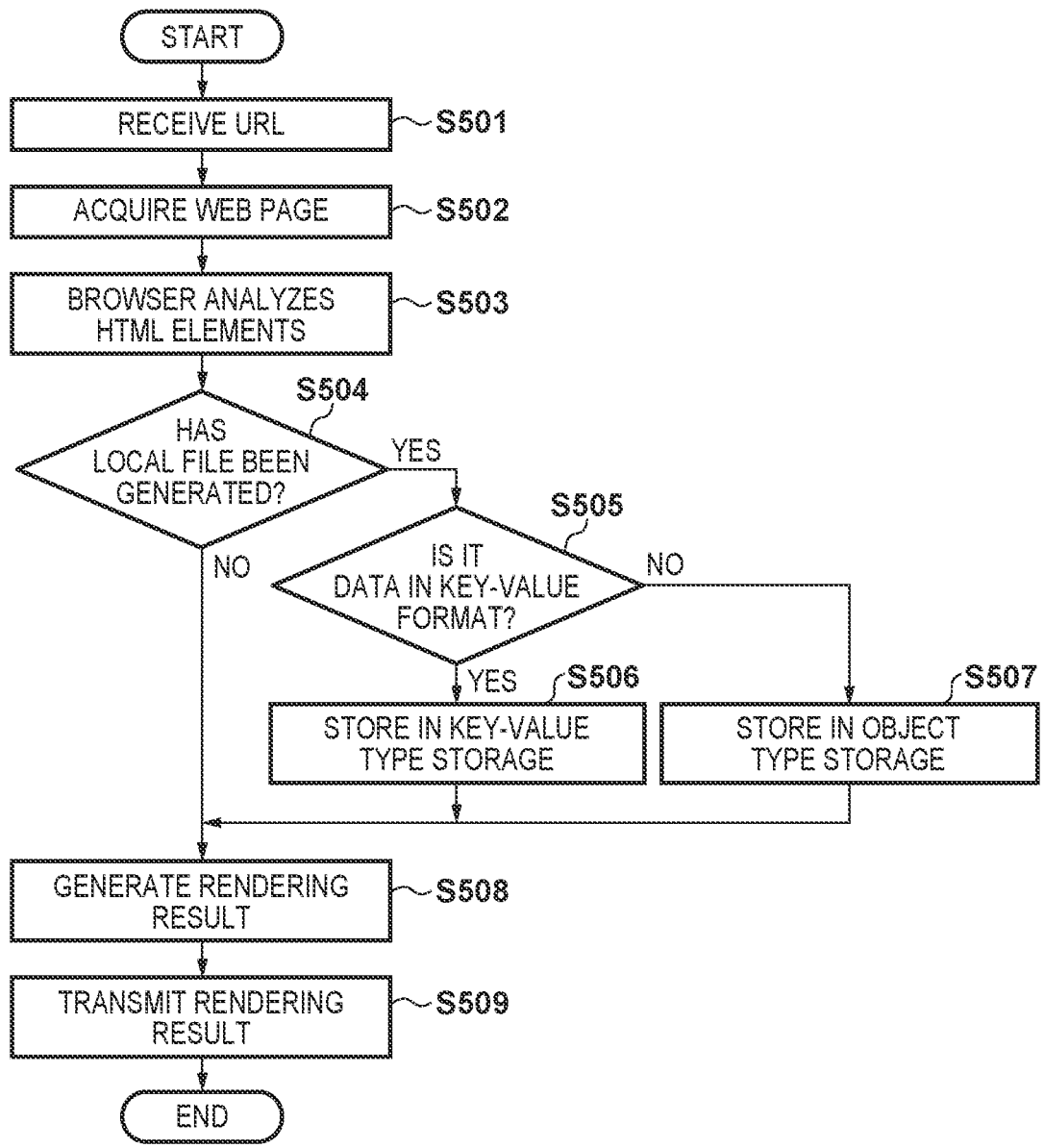
FIG. 5 is a flowchart illustrating an operation of an image generation system 400.

Next, the operation of the image generation system 400 will be described in accordance with the flowchart of FIG. 5. In the following, description will be given assuming that the load balancer 301 has determined to start the virtual machine A 410 in accordance with the data volume of communication with the communication terminal 201, the characteristics of the communication, and the like prior to starting the processing that accords with the flowchart of FIG. 5. Note, the timing of this determination is not limited to a specific timing. Accordingly, in the following, it is assumed that the virtual machine A 410 has been started (the virtual machine B 411 may or may not have been started).

In step S501, the browser 206 in the virtual machine A 410 receives the URL of the Web page 202 transmitted from the communication terminal 201 via the gateway 204 and the load balancer 301.

In step S502, the browser 206 acquires the data of the Web page 202 by accessing the Web page 202 corresponding to the URL received in step S501 via the gateway 204. The data of the Web page 202 includes an HTML document, JavaScript®, CSS files, external fonts, images, and the like.

In step S503, the browser 206 analyzes HTML elements in the HTML document in order from the top row of the HTML document, which is the data of the Web page 202 acquired in step S502.

In step S504, the data type determination unit 401 determines whether or not a local file is generated by JavaScript or CSS which are data of the Web page 202 (a local file is generated while the browser 206 interprets the Web page 202 and performs processing), as a result of the analysis in step S503.

As a result of this determination, if it is determined that a local file is to be generated, the processing proceeds to step S505, and if it is determined that a local file is not to be generated, the processing proceeds to step S508.

In step S505, the data type determination unit 401 determines whether or not a local file generated by JavaScript or CSS (a local file generated while the browser 206 interprets and processes the Web page 202) is data in a key-value format.

As a result of this determination, if the local file generated by JavaScript or CSS (the local file generated while the browser 206 interprets and processes the Web page 202) is data in a key-value format, the processing proceeds to step S506. On the other hand, if the local file generated by JavaScript or CSS (the local file generated while the browser 206 interprets and processes the Web page 202) is not data in a key-value format, the processing proceeds to step S507.

In step S506, the data type determination unit 401 stores the local file generated by JavaScript or CSS (a local file generated while the browser 206 interprets and processes the Web page 202) in the key-value type storage 404.

In step S507, the data type determination unit 401 stores the local file generated by JavaScript or CSS (a local file generated while the browser 206 interprets and processes the Web page 202) in the object type storage 403.

In step S508, the browser 206 generates the rendering result of the Web page 202 using the data of the Web page 202 acquired in step S502. In step S509, the browser 206 transmits the rendering result of the Web page 202 generated in step S508 to the communication terminal 201 via the load balancer 301 and the gateway 204.

Figure 6:
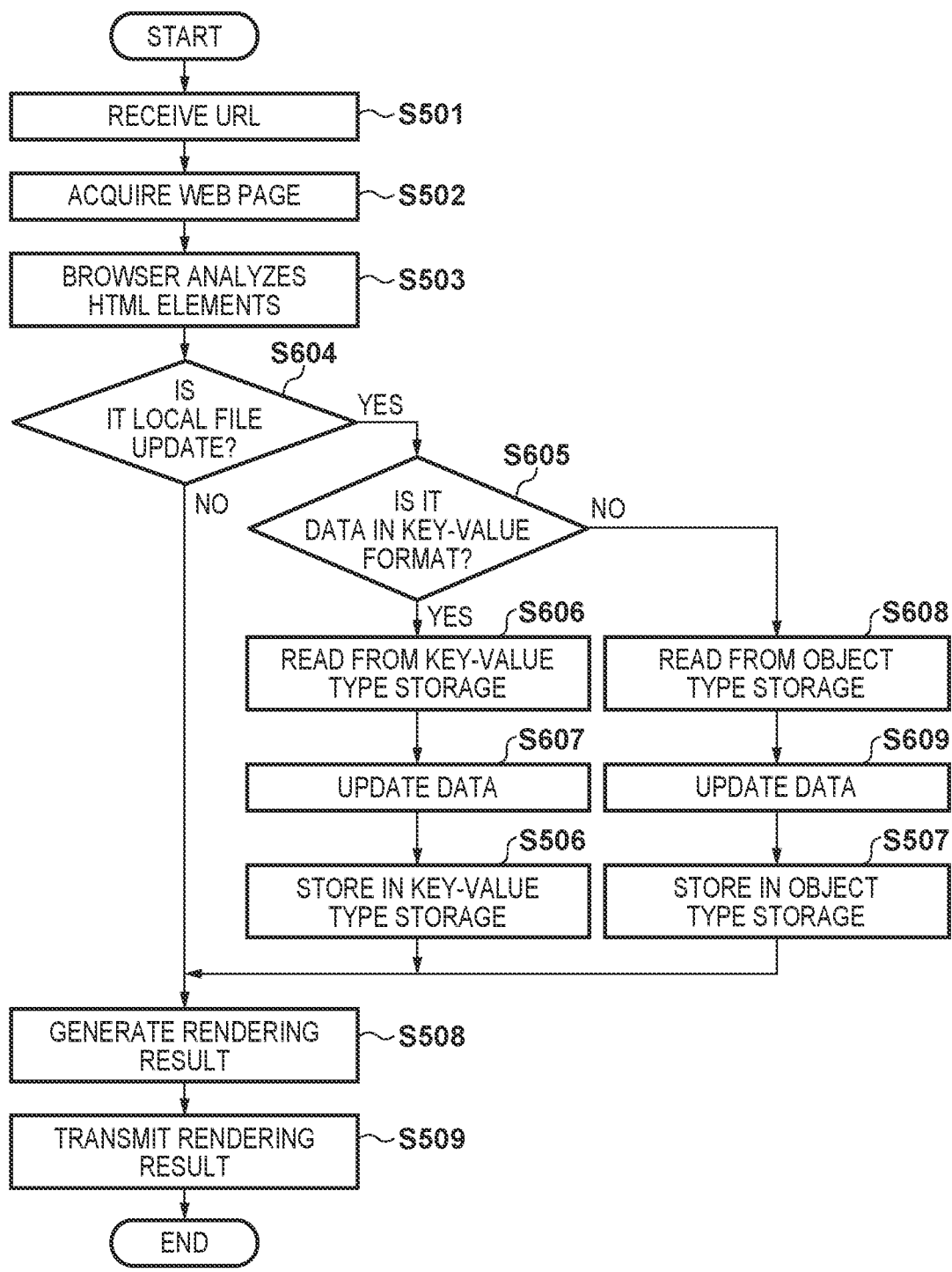
FIG. 6 is a flowchart illustrating an operation of the image generation system 400 which generates and holds a local file.

Note, although the above explanation is an explanation of the case where the virtual machine A 410 is started and operated, the same processing can be achieved even if the virtual machine B 411 is started and operated. That is, instead of the browser 206, the browser 303 operates in the same way as the browser 206, and instead of the data type determination unit 401, the data type determination unit 402 operates in the same way as the data type determination unit 401. Next, an operation of the image generation system 400 that generates and holds a local file will be described in accordance with the flowchart of FIG. 6. In FIG. 6, the processing steps that are the same as those illustrated in FIG. 5 are assigned the same step numbers, and description pertaining to such processing steps is omitted.

In the following, description will be given assuming that the load balancer 301 has determined to start the virtual machine B 411 in accordance with the data volume of communication with the communication terminal 201, the characteristics of the communication, and the like prior to starting the processing that accords with the flowchart of FIG. 6. Note, the timing of this determination is not limited to a specific timing. Accordingly, in the following, it is assumed that the virtual machine B 411 has been started (the virtual machine A 410 may or may not have been started).

In step S604, the data type determination unit 402 determines whether or not a local file is updated by JavaScript or CSS which are data of the Web page 202 (a local file is updated while the browser 303 interprets the Web page 202 and performs processing), as a result of the analysis in step S503.

As a result of this determination, if it is determined that a local file is to be updated, the processing proceeds to step S605, and if it is determined that a local file is not to be updated, the processing proceeds to step S508.

In step S605, the data type determination unit 402 determines whether or not a local file updated by JavaScript or CSS (a local file updated while the browser 303 interprets and processes the Web page 202) is data in a key-value format.

As a result of this determination, if the local file updated by JavaScript or CSS (the local file updated while the browser 303 interprets and processes the Web page 202) is data in a key-value format, the processing proceeds to step S606. On the other hand, if the local file updated by JavaScript or CSS (the local file updated while the browser 303 interprets and processes the Web page 202) is not data in a key-value format, the processing proceeds to step S608.

In step S606, the data type determination unit 402 reads out the local file from the key-value type storage 404. Then, in step S607, the data type determination unit 402 updates by JavaScript or CSS the local file read out in step S606. In step S506, the data type determination unit 402 stores the local file updated in step S607 in the key-value type storage 404.

In step S608, the data type determination unit 402 reads out the local file from the object type storage 403. Then, in step S609, the data type determination unit 402 updates by JavaScript or CSS the local file read out in step S608. In step S507, the data type determination unit 402 stores the local file updated in step S609 in the object type storage 403.

As described above, by storing a local file generated by a browser running on a virtual machine in storage on the server different from the storage region of the virtual machine, the local file generated by the browser 206 running on the virtual machine A 205 can be read from the browser 303 running on the virtual machine B 302. This makes it possible to correctly execute the Web standard technology that uses local files, even if the availability of the cloud browser is improved. Note, the virtual machine 100 may be configured to store, among the files generated while a Web page is interpreted and processed, those other than the local files in a region which is a storage region of the virtual machine and inaccessible to other virtual machines.

<Variation>

In the present variation, a local file is stored in storage corresponding to the data size of the local file. Storage that runs on a server includes storage that is characterized by low cost and high-capacity storage, and storage that can be accessed at high speed but has high usage fees. One of the methods to reduce the usage fees for cloud browsers is a method of using storage is to store large-volume data in low-cost storage.

Figure 13:
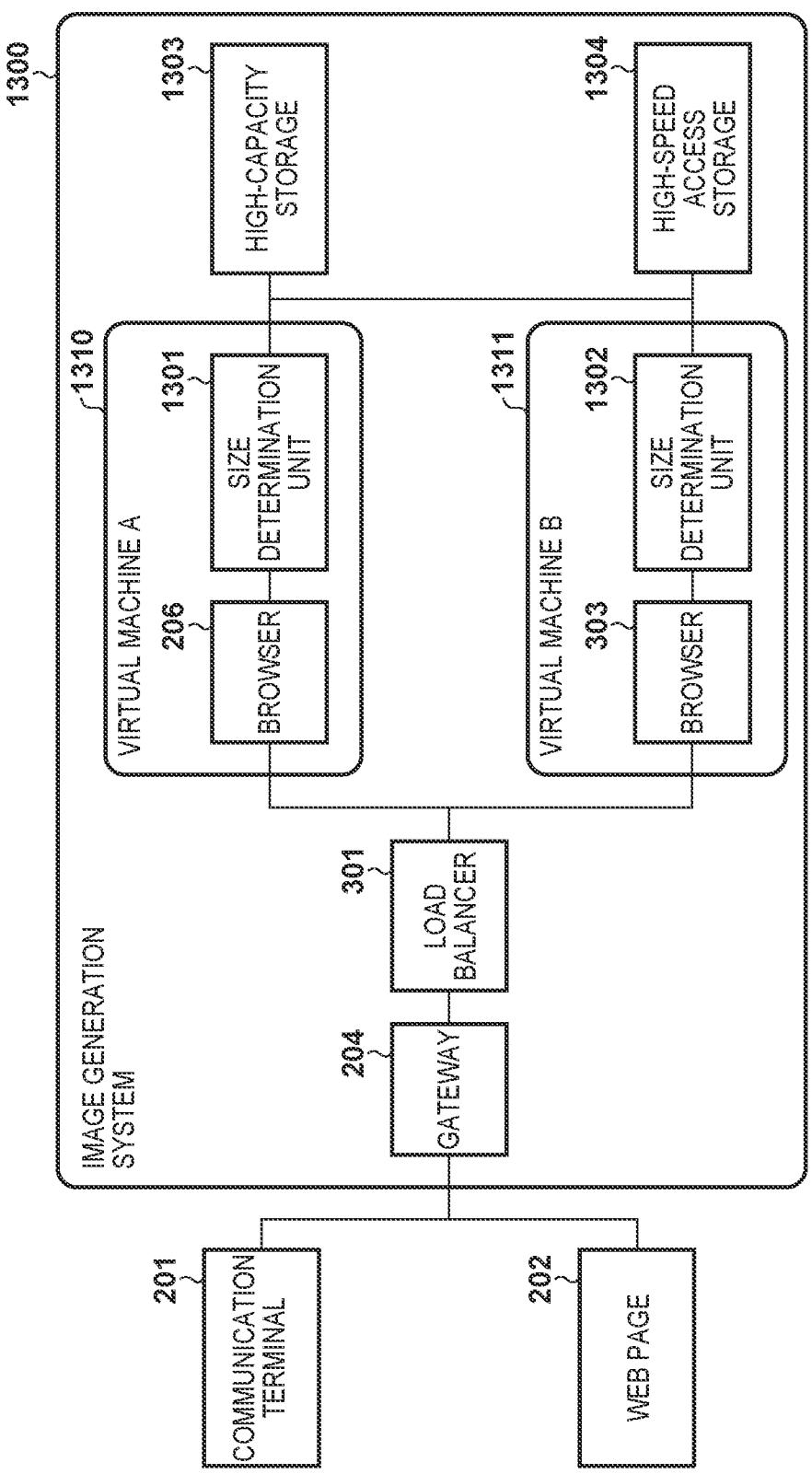
FIG. 13 is a block diagram illustrating a configuration example of a system of a cloud browser according to a variation.

A configuration example of a system of a cloud browser according to the present variation will be described with reference to a block diagram of FIG. 13. In the system of FIG. 13, the image generation system 400 has been replaced with an image generation system 1300 in the system of FIG. 4. A virtual machine A 1310 in the image generation system 1300 is the data type determination unit 401 in the virtual machine A 410 of the image generation system 400 replaced with a size determination unit 1301. Also, a virtual machine B 1311 in the image generation system 1300 is the data type determination unit 402 in the virtual machine B 411 of the image generation system 400 replaced with a size determination unit 1302. Also, the image generation system 1300 includes high-capacity storage 1303 and high-speed access storage 1304 instead of the object type storage 403 and the key-value type storage 404. Both the high-capacity storage 1303 and the high-speed access storage 1304 are provided separately from a storage region of the virtual machine A 1310 and a storage region of the virtual machine B 1311. The high-capacity storage 1303 is storage that is characterized by low cost and high-capacity storage, and the high-speed access storage 1304 is storage that can be accessed at high speed but has high usage fees.

The load balancer 301 of FIG. 13 determines whether to start the virtual machine A 1310 or the virtual machine B 1311 in accordance with the data volume of communication that passes through the gateway 204, the characteristics of the communication, and the like, and one of the virtual machines that accords with the result of the determination starts.

Figure 14:
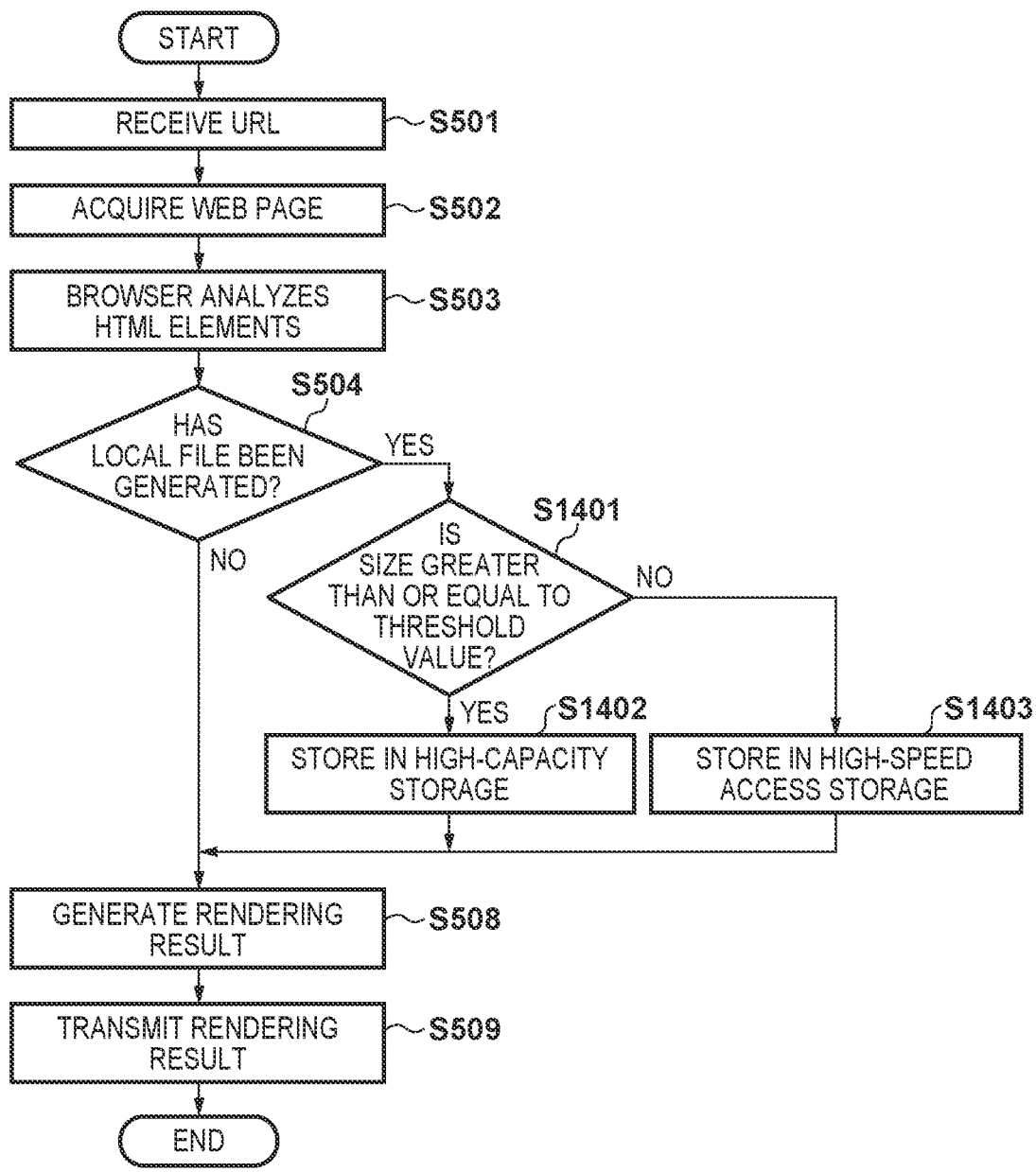
FIG. 14 is a flowchart illustrating an operation of an image generation system 1300 according to the variation.

An operation of the image generation system 1300 in the present variation will be described in accordance with the flowchart of FIG. 14. In FIG. 14, the processing steps that are the same as those of FIG. 5 are assigned the same step numbers, and description pertaining to such processing steps is omitted.

In the following, description will be given assuming that the load balancer 301 has determined to start the virtual machine A 1310 in accordance with the data volume of communication with the communication terminal 201, the characteristics of the communication, and the like prior to starting the processing that accords with the flowchart of FIG. 14. Note, the timing of this determination is not limited to a specific timing. Accordingly, in the following, it is assumed that the virtual machine A 1310 has been started (the virtual machine B 1311 may or may not have been started).

As a result of the determination in step S504, if it is determined that a local file is to be generated, the processing proceeds to step S1401, and if it is determined that a local file is not to be generated, the processing proceeds to step S508.

In step S1401, the size determination unit 1301 determines whether or not a data size S of the local file generated by JavaScript or CSS (a local file generated while the browser 206 interprets and processes the Web page 202) is greater than or equal to a threshold value.

As a result of this determination, if the data size S of the local file is greater than or equal to the threshold value, the processing proceeds to step S1402, and if the data size S of the local file is less than the threshold value, the processing proceeds to step S1403.

In step S1402, the size determination unit 1301 stores the local file generated by JavaScript or CSS (a local file generated while the browser 206 interprets and processes the Web page 202) in the high-capacity storage 1303.

In step S1403, the size determination unit 1301 stores the local file generated by JavaScript or CSS (a local file generated while the browser 206 interprets and processes the Web page 202) in the high-speed access storage 1304.

Second Embodiment

In each of the following embodiments including the present embodiment, differences from the first embodiment will be described, and the remaining is assumed to be the same as in the first embodiment unless it is specifically stated otherwise. In the present embodiment, a case where a Web standard technology for generating a local file is temporarily processed using a storage region of a virtual machine is considered. In general, the use of storage on servers aside from virtual machines increases system usage fees. For this reason, it is desirable to have a configuration in which Web standard technology can be executed to a certain extent and the system usage fees can be reduced when a cloud browser customer wants to use the cloud browser even though the function is restricted. Here, the usage fee is often lower for the storage region inside the virtual machine than the storage on a server different from the virtual machine. Accordingly, a configuration for processing a part of the Web standard technology, which uses local files, using the storage region inside the virtual machine is indicated.

Next, a configuration example of a system of a cloud browser according to the present embodiment will be described with reference to a block diagram of FIG. 7. A virtual machine A 710 included in the image generation system 700 is the virtual machine A 410 of FIG. 4 to which a storage region 701 has been added. Also, a virtual machine B 711 included in the image generation system 700 is the virtual machine B 411 of FIG. 4 to which a storage region 702 has been added.

Figure 7:
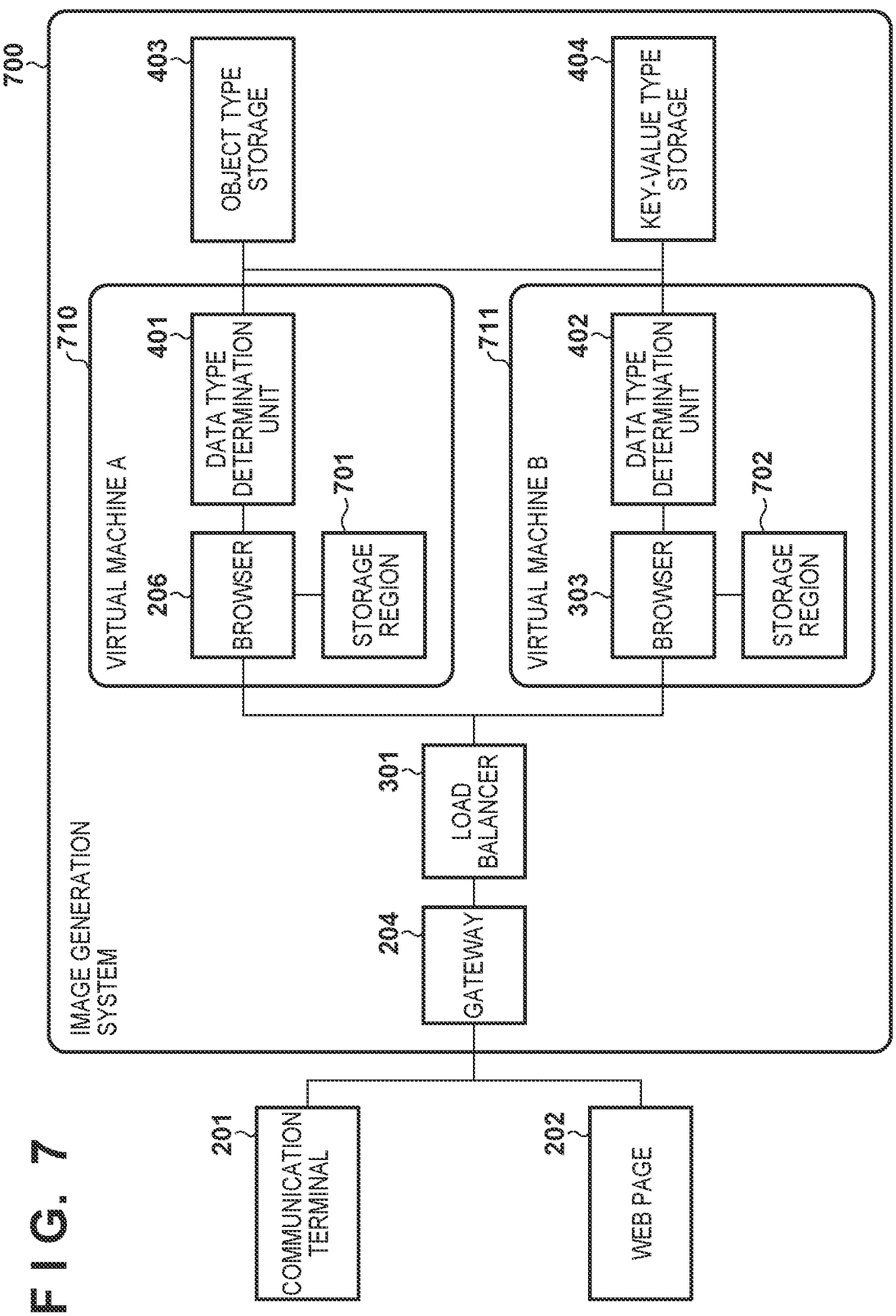
FIG. 7 is a block diagram illustrating a configuration example of a system of a cloud browser according to a second embodiment.

The load balancer 301 of FIG. 7 determines whether to start the virtual machine A 710 or the virtual machine B 711 in accordance with the data volume of communication that passes through the gateway 204, the characteristics of the communication, and the like, and one of the virtual machines that accords with the result of the determination starts.

Figure 8:
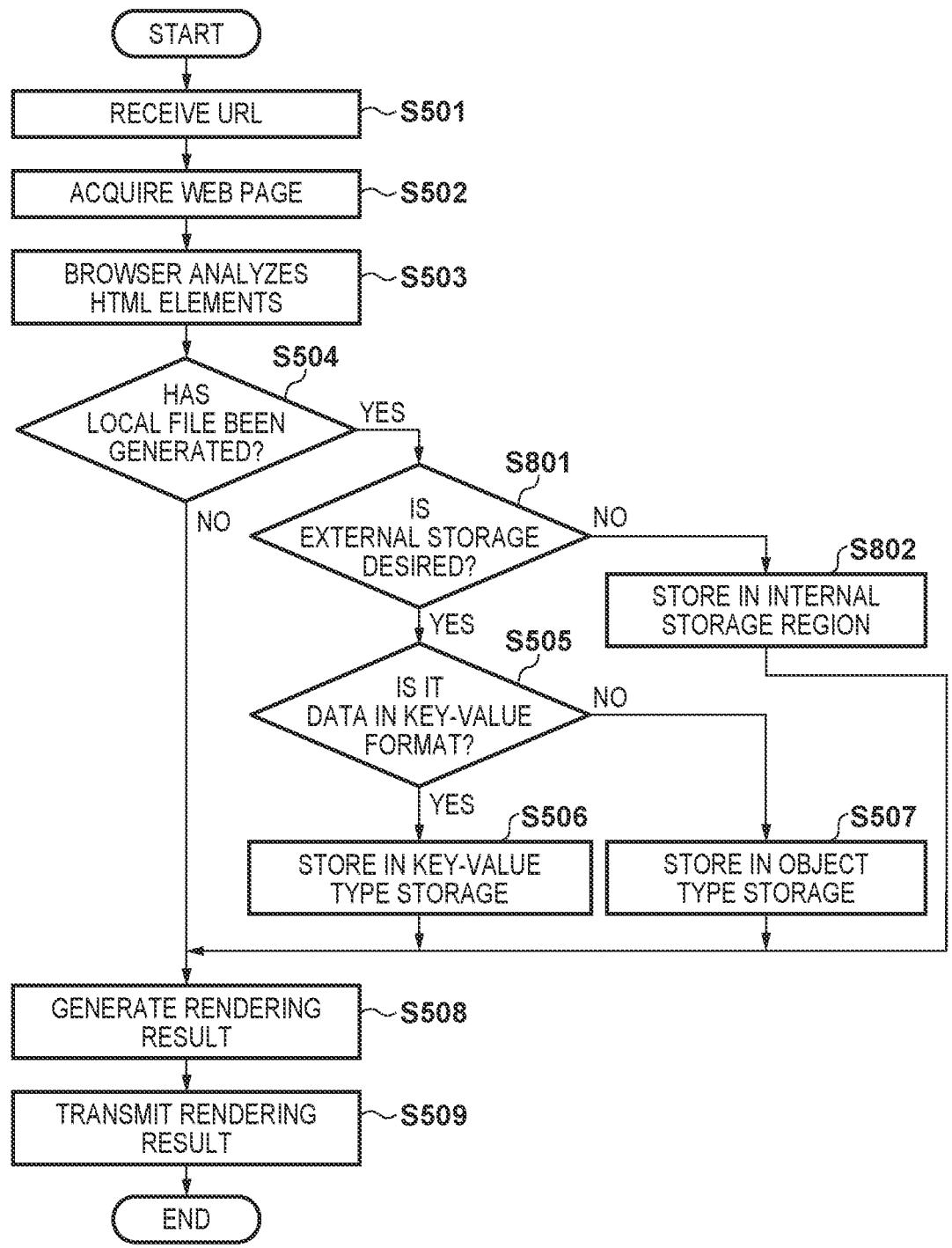
FIG. 8 is a flowchart illustrating an operation of an image generation system 700 according to the second embodiment.

An operation of the image generation system 700 according to the present embodiment will be described in accordance with the flowchart of FIG. 8. In FIG. 8, the processing steps that are the same as those of FIG. 5 are assigned the same step numbers, and description pertaining to such processing steps is omitted.

In the following, description will be given assuming that the load balancer 301 has determined to start the virtual machine A 710 in accordance with the data volume of communication with the communication terminal 201, the characteristics of the communication, and the like prior to starting the processing that accords with the flowchart of FIG. 8. Note, the timing of this determination is not limited to a specific timing. Accordingly, in the following, it is assumed that the virtual machine A 710 has been started (the virtual machine B 711 may or may not have been started).

In step S801, the browser 206 displays on the above-described display unit a screen (inquiry screen) for inquiring the user whether or not they wish to use the storage on a server different from the virtual machine as the storage destination of the local file. A display example of the inquiry screen is illustrated in FIG. 9A.

Figure 9A:
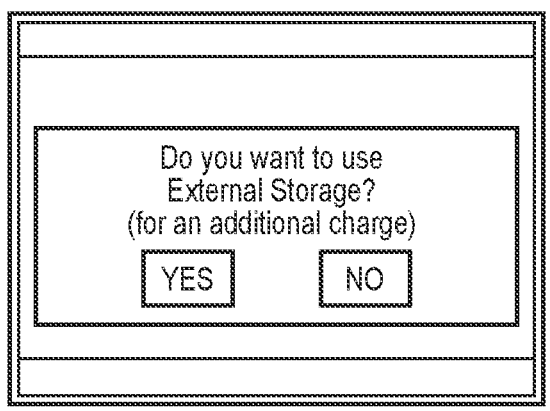
FIG. 9A is a view illustrating a display example of an inquiry screen.

The inquiry screen illustrated in FIG. 9A inquires the user whether or not they wish to use the storage on a server different from the virtual machine, although there is an additional charge. If the user instructs the "YES" button on the inquiry screen (desires to use storage on a server different from the virtual machine) by operating the above-described operation unit, the processing proceeds to step S505. On the other hand, if the user instructs the "NO" button on the inquiry screen (does not desire to use storage on a server different from the virtual machine) by operating the above-described operation unit, the processing proceeds to step S802. In step S802, the data type determination unit 401 stores the local file in the storage region 701 which is a storage region of the virtual machine A 710.

Note, in step S802, the browser 206 may display on the above-described display unit a screen (warning screen) in which warning text is indicated to the user. A display example of the warning screen is illustrated in FIG. 9B.

Figure 9B:
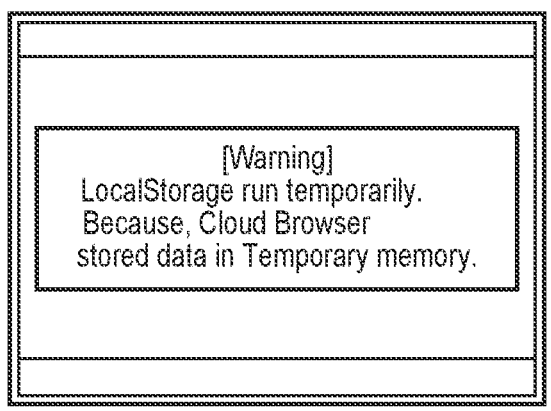
FIG. 9B is a view illustrating a display example of a warning screen.

The warning screen illustrated in FIG. 9B is a screen for notifying the user that although the data recorded in the local file is stored until the use of the cloud browser is ended, once the use of the cloud browser is ended, the data recorded in the local file will not be readable when the cloud browser is used the next time.

As an application of storing a local file in a storage region of a virtual machine, there is an application of using in a chat system, which uses local storage, at low cost. The chat system records a user name using local storage at the time of the start of use. The user name is read from the local storage at the time of the next startup.

In this case, in the present embodiment, it is possible to use the chat system since the user name is stored in the storage region of the virtual machine using local storage. On the other hand, if the load balancer specifies a different virtual machine the next time the cloud browser is started, it will take time and effort to re-enter the user name. Although it will be less convenient in order to reduce the usage fees for the cloud browser system, it will be possible to use the chat function, which is the main function.

In the present embodiment, at the time the operation of the virtual machine is ended, the local file stored in the storage region of the virtual machine may be deleted. If the local file is deleted, the behavior of the Web page will be the same each time the Web page is accessed by a cloud browser. In the case of the chat system, it is possible to unify to the usage method of entering the user name each time.

On the other hand, at the time the operation of the virtual machine is ended, the local file may remain stored in the storage region. In the case of the chat system, if the load balancer specifies a different virtual machine, it will take time and effort to enter the user name, but if the same virtual machine is specified, the user name will be read from the local file.

Third Embodiment

In the present embodiment, an example in which a local file is transmitted to the user's device and a local file uploaded by the user is used the next time the cloud browser is used is indicated. A configuration example of a system of a cloud browser according to the present embodiment will be described with reference to a block diagram of FIG. 10. The image generation system 1000 of FIG. 10 has a configuration of the image generation system 400 in which the virtual machine A 410 and the virtual machine B 411 have been replaced with a virtual machine A 1010 and a virtual machine B 1011, respectively, and the object type storage 403 and the key-value type storage 404 have been deleted.

The load balancer 301 of FIG. 10 determines whether to start the virtual machine A 1010 or the virtual machine B 1011 in accordance with the data volume of communication that passes through the gateway 204, the characteristics of the communication, and the like, and one of the virtual machines that accords with the result of the determination starts.

Figure 11:
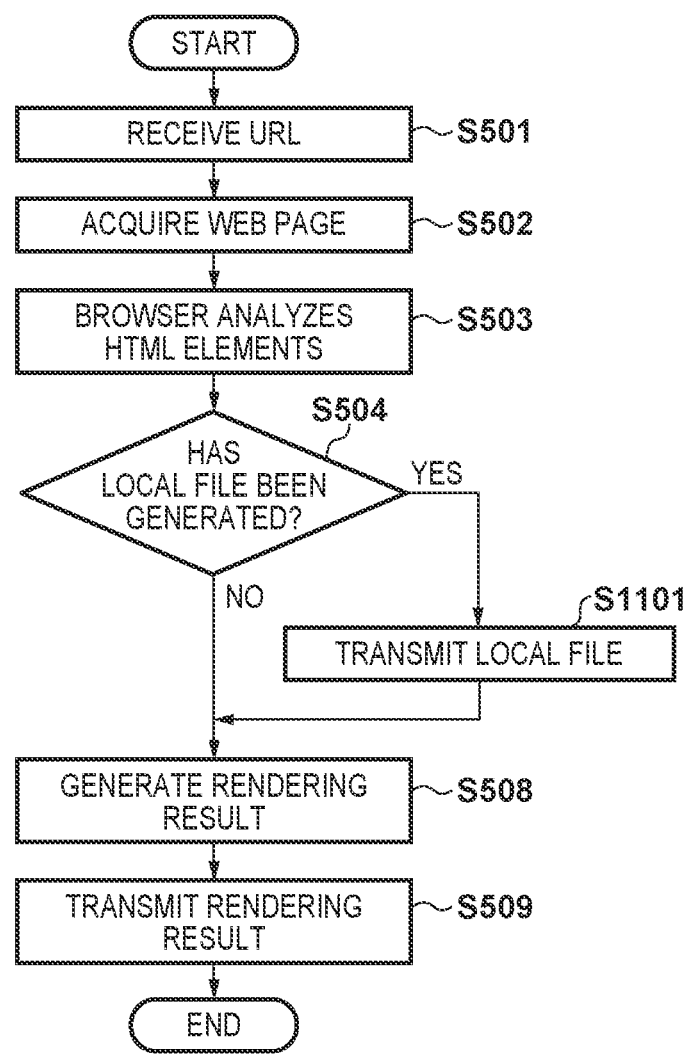
FIG. 11 is a flowchart illustrating an operation of an image generation system 1000 according to the third embodiment.

An operation of the image generation system 1000 according to the present embodiment will be described in accordance with the flowchart of FIG. 11. In FIG. 11, the processing steps that are the same as those of FIG. 5 are assigned the same step numbers, and description pertaining to such processing steps is omitted.

In the following, description will be given assuming that the load balancer 301 has determined to start the virtual machine A 1010 in accordance with the data volume of communication with the communication terminal 201, the characteristics of the communication, and the like prior to starting the processing that accords with the flowchart of FIG. 11. Note, the timing of this determination is not limited to a specific timing. Accordingly, in the following, it is assumed that the virtual machine A 1010 has been started (the virtual machine B 1011 may or may not have been started).

As a result of the determination in step S504, if it is determined that a local file is to be generated, the processing proceeds to step S1101, and if it is determined that a local file is not to be generated, the processing proceeds to step S508. In step S1101, a file transmission unit 1001 transmits the local file to the communication terminal 201, which is the user's device, via the load balancer 301 and the gateway 204. In other words, in the present embodiment, the communication terminal 201 is handled as storage for local files.

Figure 12:
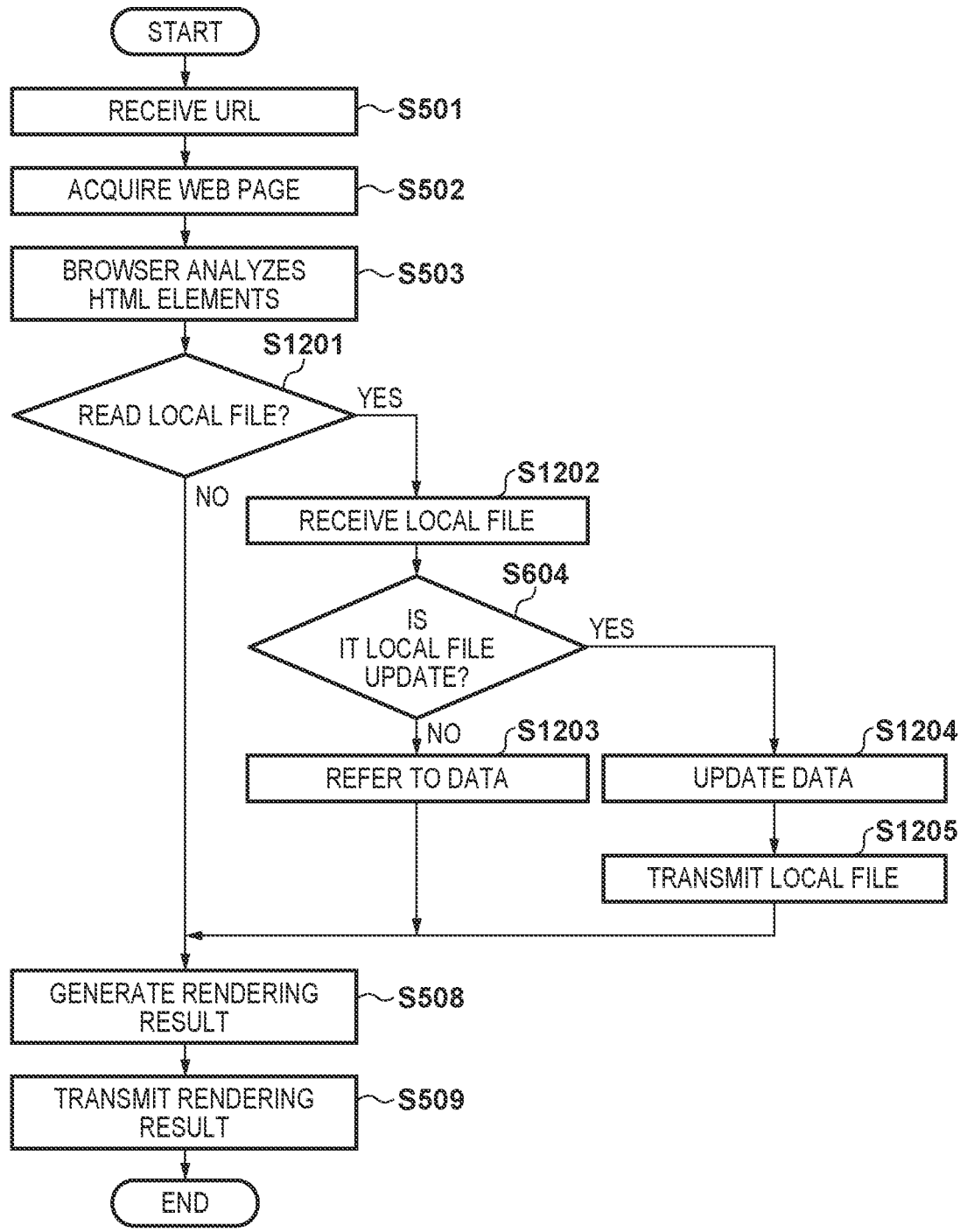
FIG. 12 is a flowchart illustrating an operation of the image generation system 1000 after the processing according to the flowchart of FIG. 11.

An operation of the image generation system 1000 after the processing that accords with the flowchart of FIG. 11 will be described in accordance with the flowchart of FIG. 12. In FIG. 12, the processing steps that are the same as those of FIGS. 5 and 6 are assigned the same step numbers, and description pertaining to such processing steps is omitted.

In the following, description will be given assuming that the load balancer 301 has determined to start the virtual machine A 1010 in accordance with the data volume of communication with the communication terminal 201, the characteristics of the communication, and the like prior to starting the processing that accords with the flowchart of FIG. 12. Note, the timing of this determination is not limited to a specific timing. Accordingly, in the following, it is assumed that the virtual machine A 1010 has been started (the virtual machine B 1011 may or may not have been started).

As a result of the determination in step S1201, if it is determined that a local file is to be read, the processing proceeds to step S1202, and if it is determined that a local file is not to be read, the processing proceeds to step S508.

In step S1202, a file reception unit 1002 in the virtual machine A 1010 receives the local file from the communication terminal 201 via the load balancer 301 and the gateway 204.

As a result of the determination in step S604, if it is determined that a local file is to be updated, the processing proceeds to step S1204, and if it is determined that a local file is not to be updated, the processing proceeds to step S1203.

In step S1204, the file reception unit 1002 updates by JavaScript or CSS the local file received in step S1202. Then, in step S1205, the file transmission unit 1001 transmits the local file updated in step S1204 to the communication terminal 201 via the load balancer 301 and the gateway 204.

In step S1203, the file reception unit 1002 refers by JavaScript or CSS to the local file received in step S1202. If it is no update and it is only a reference, the local file is not transmitted to the user's device.

As described above, by virtue of the present embodiment, it is possible to execute the Web standard technology for generating a local file without having any region for storing local files on a cloud browser. However, in this configuration, it takes time and effort to store the local file on the communication terminal 201. In addition, the execution speed of Web standard technology may decrease because local files must be acquired by communication from a remote location.

Fourth Embodiment

In the present embodiment, an example of directly sharing a local file between virtual machines is indicated. When a local file is shared on a cloud browser in which a large number of virtual machines are provided, the network load and the data management cost increase, so it is better to manage the local file in the storage on a server different from the virtual machine as in the first embodiment. On the other hand, if there are only a few virtual machines and those virtual machines are on a cloud browser that is always operating, the management cost may be smaller to directly share local files.

Figure 15:
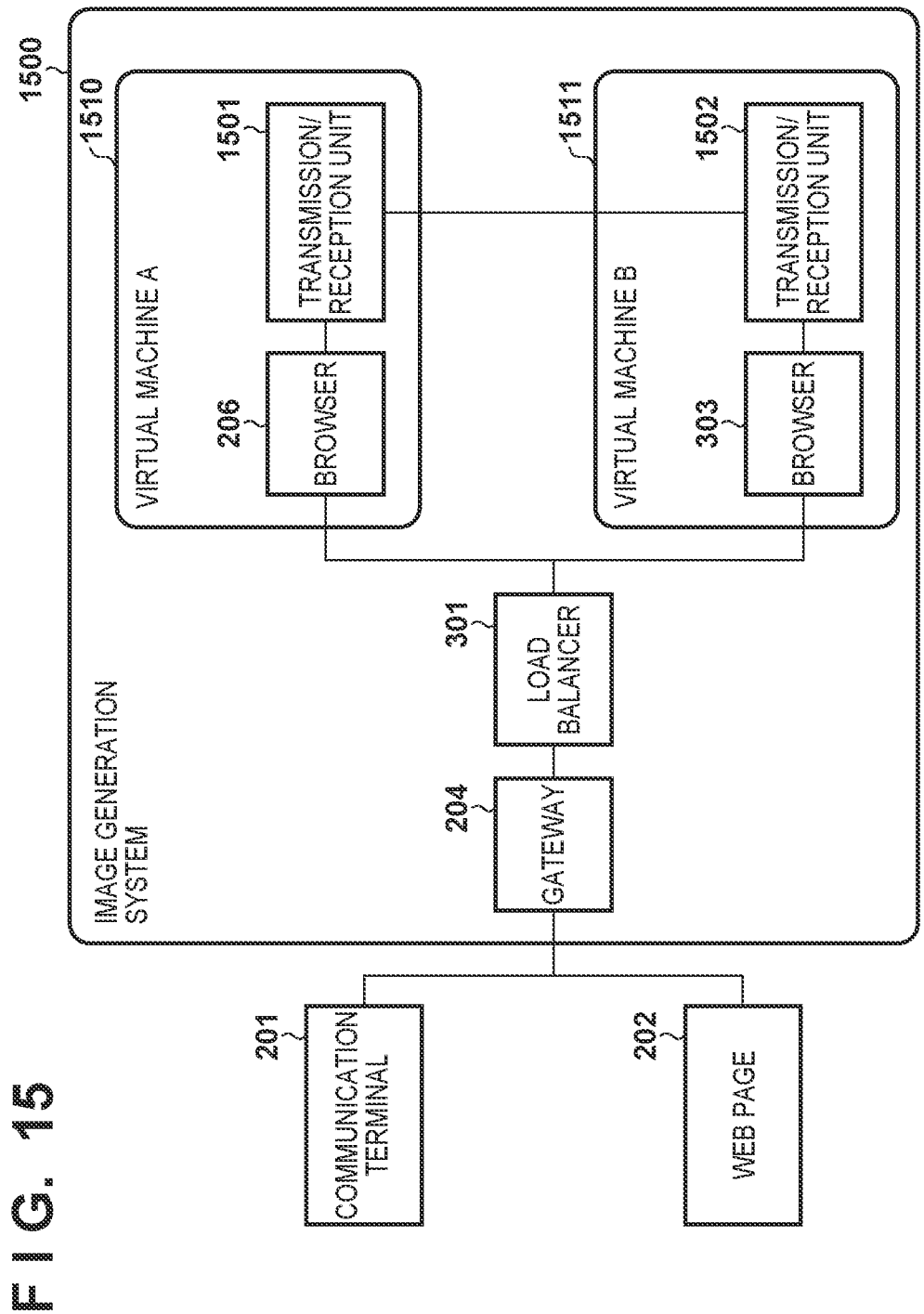
FIG. 15 is a block diagram illustrating a configuration example of a system of a cloud browser according to a fourth embodiment.

A configuration example of a system of a cloud browser according to the present embodiment will be described with reference to a block diagram of FIG. 15. An image generation system 1500 of FIG. 15 has a configuration of the image generation system 400 of FIG. 4 in which the virtual machine A 410 and the virtual machine B 411 have been replaced with a virtual machine A 1510 and a virtual machine B 1511, respectively, and the object type storage 403 and the key-value type storage 404 have been deleted.

The virtual machine A 1510 includes the browser 206 and a transmission/reception unit 1501. The virtual machine B 1511 includes the browser 303 and a transmission/reception unit 1502. The transmission/reception unit 1501 and the transmission/reception unit 1502 perform the same operation and perform transmission and reception of local files by performing direct communication between each other.

Figure 16:
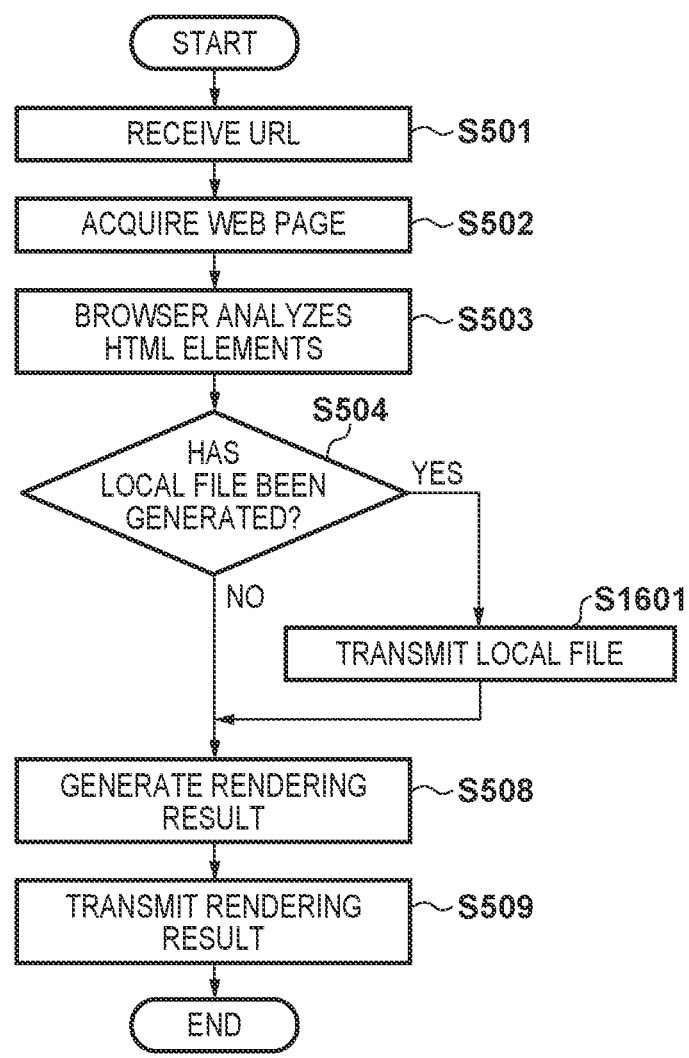
FIG. 16 is a flowchart illustrating an operation of an image generation system 1500 according to the fourth embodiment.

An operation of the image generation system 1500 according to the present embodiment will be described in accordance with the flowchart of FIG. 16. In FIG. 16, the processing steps that are the same as those of FIG. 5 are assigned the same step numbers, and description pertaining to such processing steps is omitted.

In the following, description will be given assuming that the load balancer 301 has determined to start the virtual machine A 1510 in accordance with the data volume of communication with the communication terminal 201, the characteristics of the communication, and the like prior to starting the processing that accords with the flowchart of FIG. 16. Note, the timing of this determination is not limited to a specific timing. Accordingly, in the following, it is assumed that the virtual machine A 1510 has been started (the virtual machine B 1511 may or may not have been started).

As a result of the determination in step S504, if it is determined that a local file is to be generated, the processing proceeds to step S1601, and if it is determined that a local file is not to be generated, the processing proceeds to step S508.

In step S1601, the transmission/reception unit 1501 transmits the local file generated by JavaScript or CSS (a local file generated while the browser 206 interprets and processes the Web page 202) to the transmission/reception unit 1502.

Fifth Embodiment

In each of the above embodiments, each functional unit of the virtual machines illustrated in FIGS. 4, 7, 10, 13, and 15 has been described as the performer of processing. In practice, however, by the CPU 101 executing a computer program that causes the CPU 101 to execute the functions of each functional unit except for the storage regions 701 and 702, the functions of the functional units are realized. Note, each functional unit of the virtual machines illustrated in FIGS. 4, 7, 10, 13, and 15 may be implemented by hardware.

Also, in each of the above-described embodiments, various output destinations are described as output destinations (storage destinations, transmission destinations) of the local file. However, these embodiments are merely an example of outputting a "local file generated while a browser interprets and processes a Web page" to storage different from the storage region of a virtual machine. Accordingly, the data type determination unit 401 (402), the file transmission unit 1001 (1003), the size determination unit 1301 (1302), and the transmission/reception unit 1501 (1502) are merely examples of an "output unit that outputs a local file generated while a browser interprets and processes a Web page to storage different from the storage region of a virtual machine."

In addition, the numbers, processing timings, processing orders, transmission destinations/transmission sources of data (information), screen configurations, operation methods, and the like used in the above-described embodiments have been given as an example in order to provide a specific explanation, and does not intend to limit the present invention to such an example.

In addition, some or all of the above-described embodiments and variations may be appropriately used in combination. In addition, some or all of the above-described embodiments and variations may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-147084, filed Sep. 1, 2020, which is hereby incorporated by reference herein in its entirety.

What is claimed is:

1. An information processing system installed on a cloud comprising:
a plurality of virtual machines provided on a cloud, wherein
each of the plurality of virtual machines comprises:
a browser;
a processor; and
a memory including instructions stored thereon, which when executed by the processor cause each of the plurality of virtual machines to:
cause the browser to perform analysis of a Web page;
determine, as a result of the analysis of the Web page by the browser, whether or not a local file which is a file to be stored in the browser is generated by JavaScript or Cascading Style Sheets (CSS) which are data of the Web page;
determine whether or not the local file generated by the JavaScript or CSS is data in a key-value format in a case where it is determined that the local file is generated by the JavaScript or CSS;
in a case where the local file generated by the JavaScript or CSS is data in a key-value format, store the local file generated by the JavaScript or CSS in a key-value type storage among a plurality of storages which can be shared among the plurality of virtual machines;
in a case where the local file generated by the JavaScript or CSS is data in an object format and not in a key-value format, store the local file generated by the JavaScript or CSS in an object type storage among the plurality of storages which can be shared among the plurality of virtual machines; and
update by a second Web page, in a case where it is determined as a result of analysis of a second Web page by the browser that a file which has been output to the object type storage is updated by the second Web page, the file which has been output to the object type storage.

2. The information processing system according to claim 1, wherein
the browser inquires to a user as to whether or not the user wishes to use the plurality of storages which can be shared among the plurality of virtual machines, and
wherein the instructions when executed by the processor further cause each of the plurality of virtual machines to:
in a case where an instruction indicating that it is not desired to use the plurality of storages which can be shared among the plurality of virtual machines is inputted by the user, store the local file in a storage region that the virtual machine has and cannot be shared among the plurality of virtual machines.

3. The information processing system according to claim 1, further comprising:
a load balancer configured to determine which virtual machine among the plurality of virtual machines is to be started, wherein
a virtual machine that accords with the determination by the load balancer is started.

4. The information processing system according to claim 1, wherein Web page is a Web page corresponding to an address transmitted from an external communication terminal.

5. The information processing system according to claim 4, wherein the browser generates a rendering result of the Web page and transmits the generated rendering result to the communication terminal.

6. A method of controlling an information processing system installed on a cloud, the method comprising:
causing a browser to perform analysis of a Web page;
determining, as a result of the analysis of the Web page by the browser, whether or not a local file which is a file to be stored in the browser is generated by JavaScript or Cascading Style Sheets (CSS) which are data of the Web page;
determining whether or not the local file generated by the JavaScript or CSS is data in a key-value format in a case where it is determined that the local file is generated by the JavaScript or CSS;
in a case where the local file generated by the JavaScript or CSS is data in a key-value format, storing the local file generated by the JavaScript or CSS in a key-value type storage among a plurality of storages which can be shared among a plurality of virtual machines, wherein the plurality of virtual machines is provided on a cloud;
in a case where the local file generated by the JavaScript or CSS is data in an object format and not in a key-value format, storing the local file generated by the JavaScript or CSS in an object type storage among the plurality of storages which can be shared among the plurality of virtual machines; and
update by a second Web page, in a case where it is determined as a result of analysis of a second Web page by the browser that a file which has been output to the object type storage is updated by the second Web page, the file which has been output to the object type storage.

* * * * *